United States Patent

Biller et al.

[11] Patent Number: 5,993,862
[45] Date of Patent: Nov. 30, 1999

[54] FORMED CREAM SUBSTITUTE

[75] Inventors: Florian Biller, Untergruppenbach-Unterheinriet; Karin Frank, Heilbronn-Böckingen; Richard Kellermann, Gemmingen-Steppach; Gerhard Schneider, Heilbronn-Sontheim, all of Germany

[73] Assignee: CPC International Inc., Englewood Cliffs, N.J.

[21] Appl. No.: 08/744,043

[22] Filed: Nov. 6, 1996

[30] Foreign Application Priority Data

Nov. 20, 1995 [DE] Germany ............................ 195 43 254

[51] Int. Cl.⁶ .................................................. A61K 35/26
[52] U.S. Cl. ........................ 424/585; 424/580; 424/601; 424/603; 424/586; 424/588; 424/606; 424/613
[58] Field of Search ..................... 424/601, 603, 424/604, 585, 586, 588, 606, 613, 580

[56] References Cited

U.S. PATENT DOCUMENTS

| | | |
|---|---|---|
| 4,632,832 | 12/1986 | Okonogi et al. . |
| 5,143,742 | 9/1992 | Maroudas ................................ 426/585 |
| 5,284,674 | 2/1994 | Fazio ...................................... 426/580 |

FOREIGN PATENT DOCUMENTS

| | | |
|---|---|---|
| 0113535 | 7/1984 | European Pat. Off. . |
| 0129346 | 12/1984 | European Pat. Off. . |
| 840244 | 4/1939 | France . |
| 2326114 | 4/1980 | Germany . |
| 3913125 | 12/1989 | Germany . |
| 61-028373 | of 1984 | Japan . |
| 1124734 | 8/1968 | United Kingdom . |
| 1417952 | 12/1975 | United Kingdom . |
| 2176088 | 12/1986 | United Kingdom . |

OTHER PUBLICATIONS

Database Fsta Abstract of Munns, R.J., "High Fat and Full Fat Cream Powders as Food Ingredients."
Patent Abstracts of Japan Patent Application No. 62 166858.

*Primary Examiner*—Frank C. Eisenschenk
*Assistant Examiner*—Ali R. Salimi
*Attorney, Agent, or Firm*—Norris, McLaughlin & Marcus

[57] ABSTRACT

A formed cream substitute for the addition to hot meals and a method for its preparation. The formed cream substitute for the addition to hot meals is formed by working 20 to 60% cream powder and 10 to 50% fat powder in a 15 to 50% matrix of pure fat. The cream substitute according to the invention can be provided in the form of lumps, in the form of cubes, or in the form of a granulate. The cream substitute can be stored well at room temperature and has, on a weight basis, a higher effectiveness than liquid cream.

6 Claims, No Drawings

FORMED CREAM SUBSTITUTE

FIELD OF THE INVENTION

This invention relates to a formed cream substitute for the addition to hot meals and a method for its preparation.

BACKGROUND OF THE INVENTION

It is common practice to add cream for the refinement of meals in order to improve their taste and creaminess. While a certain ropiness is desired, substantial thickening should not occur. By the addition of cream, a binding effect is not achieved. In contrast, the addition of cream can be noticed in the color by its whitening power.

The invention is based on the need to produce a portioned product capable of storage at room temperature, which can serve as an equivalent substitute for the addition of cream for refining hot meals. The functions of cream, such as whitening power, sensation in the mouth, and taste, should be met. Moreover, the product must be readily dispersible and easy to handle.

Cream powder alone, which is commercially available, is not suitable for this purpose. It has a taste of dried milk, and when it is formed into cubes under pressure it can no longer be evenly dispersed.

From the German published patent application 23 26 114 corresponding to British Patent No. 1417952, a paste-like dried cream product is known, which contains spray dried butter powder, butter fat and/or animal or vegetable fats, starch, sodium caseinate and optionally vegetable binding agents and/or gelatin as main constituents. This known product contains 20 to 40 parts by weight of starch and is therefore strongly binding and not suitable as a cream substitute.

It is an object of the present invention to produce a portioned product capable of storage at room temperature which can serve as an equivalent substitute for the addition of cream for refining hot meals.

It is another object of the present invention that the cream substitute fulfill the functions of cream as to its whitening power, sensation in the mouth, and taste.

It is still a further object of the present invention to provide a cream substitute that is readily dispersible and easy to handle.

It is still a further object of the present invention to provide a cream substitute that does not have a thickening effect on the consistency of the food product to which it is added.

SUMMARY OF THE INVENTION

The foregoing objectives are met by a formed cream substitute for the addition to hot meals, which, according to the invention, comprises cream powder and fat powder in a matrix of pure fat. The cream substitute contains from 20% to 60% cream powder, from 10% to 5% fat powder, and from 15% to 50% of fat matrix. A fat powder on the basis of whey protein is used, which contains at least 50% of fat. The cream substitute can be provided in the form of lumps, in the form of cubes, or in the form of a granulate.

For the preparation of a lumpy cream substitute, a mixture of cream powder and fat powder is mixed in a molten fat mixture which, after cooling to an extrudable mass, is molded into single portions. For the preparation of small cubes, a batch of 30 to 55% of spray dried cream powder, 10 to 40% of spray dried fat powder and 20 to 40% of fat matrix is used.

For the preparation of a cream substitute in the form of a granulate, 30 to 60% cream powder, 10 to 40% fat powder, and 25 to 50% fat are mixed at 40–50° C. (104–122° F.) to a flowable dough and this dough is grated after cooling. As an alternative, cream powder, fat powder, and fat in the form of flakes can be homogeneously mixed and the mixture may be granulated. The heat dispersibility of the granulate, as well as of the cubes, can be improved by the addition of a small amount of lecithin in the form of a powder.

It can be of advantage to add a small amount of carbohydrate material, such as, for example, maltodextrin or starch, as a diluting agent for the fat-containing constituents of the recipe. To prevent flocculation, a small amount of a 1:1 mixture consisting of tetrasodium pyrophosphate and disodium dihydrogen diphosphate can be added to the cream substitute.

DETAILED DESCRIPTION

According to the invention, the set task is solved by a formed cream substitute which can be added to hot meals and which consists of cream powder and fat powder in a matrix of pure fat is provided.

The cream substitute according to the invention can be provided in the form of lumps, in the form of cubes, or in the form of a granulate.

Cream powder is a well-known and commercially available product. It is prepared from cream or from a mixture of milk and cream and contains at least 42% of fat and at most 5% of water. A cream powder having a fat content of 55% was not optimal as regards whitening power and ropiness. A cream powder preferred for the purposes of the present invention contains at least 45%, preferably at least 75% of fat. Usually it is produced by spray drying.

Fat powder is also a commercially available product. It is prepared from a homogenized emulsion, usually by spray drying. A basis consisting of, for example, caseinate or whey protein is used for pulverization. Fat powders preferred in the present invention contain at least 50%, preferably at least 60%, of fat. A suitable fat powder is, for example, a highly fatty powder containing 75% of fat on the basis of caseinate.

Fat powders on the basis of caseinate, however, have the disadvantage that they are unstable in the presence of an acid medium at pH values of less than 5.5. The product then flocculates. This disadvantage does not occur in fat powders in which the protein basis consists of whey protein. Those fat powders are resistant to acids. Such commercial fat powders, however, occasionally have only a low fat content, of only 15%, for example. Such fat powders are less suitable for the present invention, because due to the low fat content, the whitening power is limited. It is also possible, however, to prepare fat powders on the basis of whey protein which have a higher fat content, such as at least 50%, preferably at least 60%, for example 65%, which are then provided with sufficient whitening power and are excellently suited for the purposes of the present invention. Using such fat powders, it is possible to prepare a cream substitute according to the invention which does not flocculate even in an extremely acid medium.

According to the invention, the cream powder and the fat powder are worked in a matrix of pure fat. The person skilled in the art will not have difficulties in selecting a fat suitable for that purpose taking into account the melting points. Suitable fats include butter fat and hardened and unhardened vegetable fats, such as, for example, palm oil, all of which can be used in mixture.

A cream substitute according to the invention in general consists of 20 to 60% of cream powder, 10 to 50% of fat powder and 15 to 50% of fat matrix (all percentages are percent by weight).

For the preparation of the cream substitute according to the invention in the form of lumps, a mixture of cream powder and fat powder is mixed in a molten fat mixture, which, after cooling to an extrudable mass, can be formed into single portions by usual molding machines.

For the preparation of small cubes, preferably, a batch of 30 to 55%, in particular 30 to 35%, of spray dried cream powder, 10 to 40%, in particular 30 to 35%, of spray dried fat powder and 20 to 40%, in particular 30 to 40%, of fat matrix is used.

The cream substitute according to the invention can be portioned into lumps, for example into the form of small cubes having a weight of 5 to 10 g (0.18 to 0.35 ounces). While the cube is the form suitable for refining small quantities of food, it is less favorable in the field of large-scale catering establishments. In catering establishments, many small cubes would have to be unwrapped, while a very large cube would be difficult to dissolve. Therefore, in the field of large scale catering establishments, a flowable granulate which can be dosed freely is preferred.

A cream substitute according to the invention in the form of a granulate can be prepared by mixing 20 to 60% of cream powder, 10 to 40% of fat powder and 25 to 50% of fat at 40 to 50° C. (104 to 122° F.) to a flowable dough and by grinding it, for example, with a grater after solidification by cooling. Small particles are formed, which produce a well flowable product. In addition the fat serves as a lubricant in granulation and also improves the dispersibility of the granulate at high temperatures, because it coats the particles of the fat powder and cream powder. In order to achieve a satisfactory product, however, the addition of at least 30% of fat in the recipe is necessary.

The heat dispersibility of the granulate, as well as of the cubes, can be improved by the addition of a small amount of lecithin, such as 0.2 to 0.8% of lecithin, in the form of a powder.

A granulate can also be favorably prepared by homogeneously mixing 30 to 60% of cream powder, 10 to 40% of fat powder and 15 to 40% of fat in the form of flakes and by granulating the mixture by means of a granulating machine. The amount of pure fat added here is 15 to 40%, preferably 30 to 35%, and the addition of lecithin for improving the heat dispersibility is not required.

It can be of advantage to add a carbohydrate material, such as, for example, maltodextrin or starch, as a diluting agent for the fat-containing constituents of the recipe. The carbohydrate material should not have a binding effect, i.e. that of changing the consistency of the meal, and may therefore only be used in small amounts, for example, in an amount of 5 to 15%.

To prevent flocculation, a small amount of up to 3%, preferably 1.5 to 2%, of a 1:1 mixture consisting of tetrasodium pyrophosphate and disodium dihydrogen diphosphate can be added to the cream substitute. The addition of a larger amount can impair the taste.

The cream substitute according to the invention exhibits an equally good, often even better, whitening power than conventional liquid cream.

An additional advantage of the formed cream substitute according to the invention is that, by its addition, the meal is not diluted, as in case of the addition of liquid cream, so that the basic taste is better preserved and no change in consistency takes place. The cream substitute according to the invention effects a better creaminess, but has no binding effect.

The cream substitute according to the invention can be stored well at room temperature and has, on a weight basis, a higher effectiveness than liquid cream. A cube of 7 g (0.25 ounces) of the cream substitute according to the invention in its effect is, for example, equivalent to an amount of at least 2 tablespoons (20 g; 0.7 ounces) of commercial 30% cream.

It is not possible, however, to use the cream substitute according to the invention for the preparation of whipped cream, and, since it dissolves poorly in hot coffee, it is not very well suited as cream for coffee.

The following are examples of the present invention, and are not meant to be limiting in any way.

EXAMPLE 1

32.5 g (1.15 ounces) spray dried cream powder (having a fat content of 75%) were mixed with 32.5 g (1.15 ounces) spray dried fat powder on the basis of caseinate, having a fat content of 75% and the mixture was mixed in 35 g (1.23 ounces) of heated butter fat. The paste-like mass was extruded and formed into cubes of 7 g (0.25 ounces) each by a conventional molding machine.

The effect of such a cube was equivalent to that of an amount of at least 2 tablespoons (20 g; 0.7 ounces) of 30% cream. Two tablespoons of cream is that amount which is generally used for refining ¼ liter (0.53 pints) of food. The cubes were readily dispersible in hot meals and were equivalent to the addition of cream as to whitening power, creaminess, sensation in the mouth and taste. However, the addition of the cubes, unlike the addition of cream did not lead to a dilution of the taste or the consistency of the meals.

It was possible to store the cubes in the household without cooling.

EXAMPLE 2

32.5 g (1.15 ounces) spray dried cream powder (having a fat content of 75%) were mixed with 32.5 g (1.15 ounces) spray dried fat powder on the basis of whey protein, having a fat content of 65% and the mixture was mixed in 35 g (1.23 ounces) of a molten fat mixture consisting of hardened and unhardened vegetable fats.

The paste-like mass was extruded and formed into cubes of 7 g (0.25 ounces) by a usual molding machine.

It was possible to add the cube thus prepared to sour meals without the cube flocculating.

EXAMPLE 3

32.5 (1.15 ounces) spray dried cream powder (fat content 75%) were mixed with 32.5 g (1.15 ounces) spray dried fat powder (on the basis of whey protein, having a fat content of 65%) and 0.5 g (0.28 drams) lecithin powder (for improving the heat dispersibility) and the mixture was worked at 40 to 50° C. (104 to 122° F.) with 34.5 g (1.22 ounces) fat mixture into a flowable dough which was grated after cooling with a grater. The result was a well flowable granulate having excellent heat dispersibility.

EXAMPLE 4

40 g (1.41 ounces) spray dried cream powder (fat content 75%) were homogeneously mixed with 30 g (1.06 ounces) spray dried fat powder on the basis of whey protein, having a fat content of 65% and 30 g (1.06 ounces) fat in the form of flakes in a standard mixer. The mixture was granulated by a granulating machine to form a cylindrical granulate of short length.

The granulating machine was provided with two counterrotating rolls, one pressure roll made of full material and one perforated cylinder, on the inside of which a cutting blade scraped off the mass passing through.

It was possible to further improve the heat dispersibility of the granulate by the addition of 6 g (0.21 ounces) of maltodextrin to the batch.

The invention now being fully described, it will be apparent to one of ordinary skill in the art that many changes and modifications can be made thereto without departing from the spirit or scope of the invention as set forth herein.

We claim:

1. A formed cream substitute for the addition to hot meals comprising from 20% to 60% cream powder and from 10% to 50% fat powder in from 15% to 50% matrix of pure fat.

2. The cream substitute according to claim 1, wherein said cream powder comprises at least 45% of fat.

3. The cream substitute according to claim 1, wherein said fat powder contains at least 50% of fat.

4. The cream substitute according to claim 1, further comprising up to 3% of a mixture comprising tetrasodium pyrophosphate and disodium dihydrogen diphosphate.

5. The cream substitute according to claim 1, wherein said cream substitute is in the form of a cube of 5–10 g (0.18–0.35 ounces).

6. The cream substitute according to claim 1, wherein said cream substitute is in the form of a granulate.

* * * * *